(12) United States Patent
Alcorn

(10) Patent No.: US 11,968,026 B2
(45) Date of Patent: **\*Apr. 23, 2024**

(54) TERRESTRIAL BASED HIGH SPEED DATA COMMUNICATIONS MESH NETWORK

(71) Applicant: SMARTSKY NETWORKS LLC, Morrisville, NC (US)

(72) Inventor: Donald Alcorn, Montgomery, AL (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,613

(22) Filed: Oct. 30, 2023

(65) Prior Publication Data

US 2024/0063892 A1 Feb. 22, 2024

Related U.S. Application Data

(63) Continuation of application No. 17/886,837, filed on Aug. 12, 2022, which is a continuation of application
(Continued)

(51) Int. Cl.
*H04L 27/26* (2006.01)
*H04B 7/185* (2006.01)
(Continued)

(52) U.S. Cl.
CPC ..... *H04B 7/18506* (2013.01); *H04B 7/18508* (2013.01); *H04B 7/1851* (2013.01);
(Continued)

(58) Field of Classification Search
CPC ............ H04B 7/18506; H04B 7/18508; H04B 7/1851; H04B 27/2601
See application file for complete search history.

(56) References Cited

U.S. PATENT DOCUMENTS 614,879 A 11/1898 Miller
2,418,961 A 4/1947 Wehner
(Continued)

FOREIGN PATENT DOCUMENTS

EP 1341327 A1 3/2003
JP 2005159448 A 6/2005
(Continued)

OTHER PUBLICATIONS

Leabman, Michael A., "Adaptive Band-Partioning of Interference Cancellation in Communications System," M. Eng. Thesis, MIT EECS, 1997, all enclosed pages cited.
(Continued)

*Primary Examiner* — Diane L Lo
*Assistant Examiner* — Abusayeed M Haque
(74) *Attorney, Agent, or Firm* — Burr & Forman LLP

(57) ABSTRACT

A network for providing high speed data communications may include multiple terrestrial transmission stations that are located within overlapping communications range and a mobile receiver station. The terrestrial transmission stations provide a continuous and uninterrupted high speed data communications link with the mobile receiver station employing a wireless radio access network protocol.

20 Claims, 7 Drawing Sheets

Related U.S. Application Data

No. 17/864,822, filed on Jul. 14, 2022, now Pat. No. 11,558,108, which is a continuation of application No. 16/951,493, filed on Nov. 18, 2020, now Pat. No. 11,489,584, which is a continuation of application No. 16/599,519, filed on Oct. 11, 2019, now Pat. No. 10,855,364, which is a continuation of application No. 15/964,694, filed on Apr. 27, 2018, now Pat. No. 10,484,079, which is a continuation of application No. 15/068,783, filed on Mar. 14, 2016, now Pat. No. 9,985,717, which is a continuation of application No. 13/862,508, filed on Apr. 15, 2013, now Pat. No. 9,312,947, which is a continuation of application No. 13/601,413, filed on Aug. 31, 2012, now Pat. No. 8,792,880, and a continuation of application No. 13/601,452, filed on Aug. 31, 2012, now Pat. No. 8,442,520, said application No. 13/601,413 is a continuation of application No. 13/552,896, filed on Jul. 19, 2012, now Pat. No. 8,311,533, said application No. 13/601,452 is a continuation of application No. 13/552,896, filed on Jul. 19, 2012, now Pat. No. 8,311,533, which is a continuation of application No. 12/355,341, filed on Jan. 16, 2009, now Pat. No. 8,254,913, which is a continuation-in-part of application No. 11/622,811, filed on Jan. 12, 2007, now abandoned, which is a continuation-in-part of application No. 11/206,695, filed on Aug. 18, 2005, now abandoned.

(51) Int. Cl.
  *H04W 84/00* (2009.01)
  *H04W 84/06* (2009.01)

(52) U.S. Cl.
  CPC ....... *H04L 27/2601* (2013.01); *H04W 84/005* (2013.01); *H04W 84/06* (2013.01)

(56) References Cited

U.S. PATENT DOCUMENTS

| | | |
|---|---|---|
| 5,557,282 A | 9/1996 | Mertens |
| 5,661,649 A | 8/1997 | Carson et al. |
| 5,681,300 A | 10/1997 | Ahr et al. |
| 5,819,000 A | 10/1998 | Oshima |
| 6,047,165 A | 4/2000 | Wright et al. |
| 6,108,539 A | 8/2000 | Ray et al. |
| 6,193,194 B1 | 2/2001 | Minovitch |
| 6,201,797 B1 | 3/2001 | Leuca et al. |
| 6,285,878 B1 | 9/2001 | Lai |
| 6,345,186 B1 | 2/2002 | Schultz et al. |
| 6,377,802 B1 | 4/2002 | McKenna et al. |
| 6,487,426 B1 | 11/2002 | Haber |
| 6,507,739 B1 | 1/2003 | Gross et al. |
| 6,512,921 B1 | 1/2003 | Hadinger |
| 6,675,013 B1 | 1/2004 | Gross et al. |
| 6,694,143 B1 | 2/2004 | Beamish et al. |
| 6,757,712 B1 | 6/2004 | Bastian et al. |
| 6,779,476 B1 | 8/2004 | Sowell et al. |
| 6,781,513 B1 | 8/2004 | Korkosz et al. |
| 6,816,728 B2 | 11/2004 | Igloi et al. |
| 6,940,426 B1 | 9/2005 | Vaida |
| 7,043,225 B1 | 5/2006 | Patel et al. |
| 7,088,288 B1 | 8/2006 | Margolese et al. |
| 7,100,020 B1 | 8/2006 | Brightman et al. |
| 7,257,469 B1 | 8/2007 | Pemble |
| 7,356,389 B2 | 4/2008 | Holst et al. |
| 7,417,578 B1 | 8/2008 | Woodell et al. |
| 7,460,830 B2 | 12/2008 | Moore, III |
| 7,603,137 B1 | 10/2009 | Elliott |
| 7,626,536 B1 | 12/2009 | Rihaczek et al. |
| 7,715,853 B1 | 5/2010 | Frerking et al. |
| 7,751,815 B2 | 7/2010 | McKenna et al. |
| 7,933,599 B2 | 4/2011 | Fernandez-Corbaton et al. |
| 7,984,190 B2 | 7/2011 | Rhoads |
| 8,023,936 B2 | 9/2011 | Hudson et al. |
| 8,032,135 B1 | 10/2011 | Redford et al. |
| 8,249,586 B2 | 8/2012 | Bosenbecker |
| 8,254,913 B2 | 8/2012 | Alcorn |
| 8,311,533 B1 | 11/2012 | Alcorn |
| 8,700,032 B2 | 4/2014 | Redford et al. |
| 8,744,360 B2 | 6/2014 | Zheng et al. |
| 9,312,947 B2* | 4/2016 | Alcorn ................ H04L 27/2601 |
| 9,985,717 B2* | 5/2018 | Alcorn ................ H04B 7/1851 |
| 10,483,629 B1 | 11/2019 | Silva |
| 10,484,079 B2 | 11/2019 | Alcorn |
| 10,855,364 B2* | 12/2020 | Alcorn ............... H04B 7/18508 |
| 11,489,584 B2 | 11/2022 | Alcorn |
| 11,558,108 B2* | 1/2023 | Alcorn ............... H04B 7/18506 |
| 2001/0036822 A1 | 11/2001 | Mead et al. |
| 2001/0039189 A1 | 11/2001 | Cox |
| 2002/0004393 A1 | 1/2002 | Heppe et al. |
| 2002/0024652 A1 | 2/2002 | Ooga |
| 2002/0072332 A1 | 6/2002 | Chang et al. |
| 2002/0101632 A1 | 8/2002 | Meckler |
| 2002/0160773 A1 | 10/2002 | Gresham et al. |
| 2003/0046338 A1 | 3/2003 | Runkis |
| 2003/0052798 A1 | 3/2003 | Hanson |
| 2003/0055975 A1 | 3/2003 | Nelson et al. |
| 2003/0093187 A1 | 5/2003 | Walker |
| 2003/0093798 A1 | 5/2003 | Rogerson |
| 2003/0128681 A1 | 7/2003 | Rauschmayer |
| 2003/0203736 A1 | 10/2003 | Chi et al. |
| 2004/0008253 A1 | 1/2004 | Monroe |
| 2004/0092263 A1 | 5/2004 | Parkman et al. |
| 2004/0095907 A1 | 5/2004 | Agee et al. |
| 2004/0101274 A1 | 5/2004 | Foisy et al. |
| 2004/0132495 A1 | 7/2004 | Horton, Jr. et al. |
| 2004/0203706 A1 | 10/2004 | Dietz et al. |
| 2004/0233414 A1 | 11/2004 | Jamieson et al. |
| 2004/0240590 A1 | 12/2004 | Cameron et al. |
| 2004/0253949 A1 | 12/2004 | Swensen et al. |
| 2004/0253951 A1 | 12/2004 | Chang et al. |
| 2005/0028214 A1 | 2/2005 | Hall |
| 2005/0053026 A1 | 3/2005 | Mullan et al. |
| 2005/0059396 A1 | 3/2005 | Chuah et al. |
| 2005/0074019 A1 | 4/2005 | Handforth et al. |
| 2005/0085249 A1 | 4/2005 | Goldstein et al. |
| 2005/0088980 A1 | 4/2005 | Olkkonen et al. |
| 2005/0108374 A1 | 5/2005 | Pierzga et al. |
| 2005/0108401 A1 | 5/2005 | Gonda |
| 2005/0164664 A1 | 7/2005 | DiFonzo et al. |
| 2005/0197748 A1 | 9/2005 | Holst et al. |
| 2005/0232579 A1 | 10/2005 | Monroe et al. |
| 2005/0255845 A1 | 11/2005 | Leuca et al. |
| 2005/0256616 A1 | 11/2005 | Rhoads |
| 2005/0286451 A1 | 12/2005 | Kim et al. |
| 2006/0007952 A1 | 1/2006 | Oishi et al. |
| 2006/0035588 A1 | 2/2006 | Chapelle |
| 2006/0040612 A1 | 2/2006 | Min |
| 2006/0102798 A1 | 5/2006 | Cox et al. |
| 2006/0140572 A1 | 6/2006 | Ruiz |
| 2006/0167598 A1 | 7/2006 | Pennarola |
| 2006/0219776 A1 | 10/2006 | Finn |
| 2006/0229070 A1 | 10/2006 | de La Chapelle et al. |
| 2006/0229077 A1 | 10/2006 | Monk |
| 2006/0239537 A1 | 10/2006 | Shragai et al. |
| 2006/0251507 A1 | 11/2006 | Braswell et al. |
| 2006/0253254 A1* | 11/2006 | Herwitz ............... G08G 5/0069 701/3 |
| 2006/0264210 A1 | 11/2006 | Lovberg et al. |
| 2006/0265183 A1 | 11/2006 | Jacques et al. |
| 2007/0016371 A1 | 1/2007 | Waid et al. |
| 2007/0032250 A1 | 2/2007 | Feher |
| 2007/0032832 A1 | 2/2007 | Feher |
| 2007/0040735 A1* | 2/2007 | Matsuo ................ H01L 23/552 257/E23.114 |
| 2007/0106433 A1 | 5/2007 | He |
| 2007/0130389 A1 | 6/2007 | Petersson et al. |
| 2007/0164894 A1 | 7/2007 | Sherman et al. |
| 2007/0184846 A1 | 8/2007 | Horton, Jr. et al. |

(56) References Cited

U.S. PATENT DOCUMENTS

| | | | |
|---|---|---|---|
| 2007/0226407 A1 | 9/2007 | Radulescu et al. | |
| 2008/0090567 A1 | 4/2008 | Gilbert | |
| 2008/0233974 A1 | 9/2008 | Xu | |
| 2008/0274734 A1 | 11/2008 | Kostanic et al. | |
| 2010/0036547 A1* | 2/2010 | Myers | G08G 5/0034 701/3 |
| 2010/0073197 A1 | 3/2010 | Eagleton et al. | |
| 2010/0124210 A1 | 5/2010 | Lo | |
| 2011/0309979 A1 | 12/2011 | Redford et al. | |
| 2013/0028128 A1* | 1/2013 | Novak | H04B 17/382 370/252 |
| 2018/0054252 A1 | 2/2018 | Gan et al. | |
| 2018/0124671 A1 | 5/2018 | Zhang et al. | |
| 2022/0216896 A1* | 7/2022 | Speidel | H01Q 21/065 |
| 2022/0317290 A1* | 10/2022 | Kostanic | G01S 5/0246 |

FOREIGN PATENT DOCUMENTS

| | | |
|---|---|---|
| WO | 9621164 A1 | 7/1996 |
| WO | 0070789 A1 | 11/2000 |
| WO | 0135119 A2 | 5/2001 |
| WO | 0178257 A2 | 10/2001 |
| WO | 0201757 A1 | 1/2002 |
| WO | 2005039134 A1 | 4/2005 |
| WO | 2013089731 A1 | 6/2013 |

OTHER PUBLICATIONS

Martin, J.N., et al., "High-Speed Internet Access Via Stratospheric HALO Aircraft," Raytheon Syst. Co., Plano, TX (Piscataway, NJ, Apr. 10, 2000), from the 2000 EEEE Emerging Technologies Symposium on Broadband, Wireless Internet Access, Digest of Papers, Richardson, TX, all enclosed pages cited.

Taverna, Michael A., "From Seatback to Laptop," Aviation Week and Space Technology (New York Jul. 19, 2004). vol. 161, No. 3, all enclosed pages cited.

UTRA-UTRAN Long Term Evolution (LTE) and 3GPP System Architecture Evolution (SAE), Nov. 2-3, 2004, all enclosed pages cited.

Mecham, Michael, et al., "Meeting Expectations," Aviation Week and Space Technology (New York Feb. 28, 2005), vol. 162, all enclosed pages cited.

IPR from related U. S. Pat. No. 9,312,947, dated Mar. 12, 2020, all pages cited in its entirety.

IEEE Standard for Local and Metropolitan Area Networks, Part 16; Air Interface for Fixed Broadband Wireless Access Systems.

Patent Owner's Preliminary Response from related U.S. Pat. No. 9,312,947, dated Jun. 22, 2020, all pages cited in its entirety.

IPR Decision Denying Institution of Inter Partes Review, dated Sep. 16, 2020.

* cited by examiner

TERRESTRIAL BASED HIGH SPEED DATA COMMUNICATIONS MESH NETWORK

CROSS-REFERENCE TO RELATED APPLICATIONS

This application is a continuation of U.S. patent application Ser. No. 17/886,837 filed Aug. 12, 2022, which is a continuation of U.S. patent application Ser. No. 17/864,822 filed Jul. 14, 2022 (now U.S. Pat. No. 11,558,108 which issued Jan. 17, 2023), which is a continuation of U.S. patent application Ser. No. 16/951,493 filed Nov. 18, 2020 (now U.S. Pat. No. 11,489,584 which issued Nov. 1, 2022), which is a continuation of U.S. patent application Ser. No. 16/599,519 filed on Oct. 11, 2019 (now U.S. Pat. No. 10,855,364 which issued on Dec. 1, 2020), which is a continuation of U.S. patent application Ser. No. 15/964,694 filed Apr. 27, 2018 (now U.S. Pat. No. 10,484,079 which issued on Nov. 19, 2019), which is a continuation of U.S. patent application Ser. No. 15/068,783 filed Mar. 14, 2016 (now U.S. Pat. No. 9,985,717 which issued on May 29, 2018), which is a continuation of Ser. No. 13/862,508 filed Apr. 15, 2013 (now U.S. Pat. No. 9,312,947 which issued on Apr. 12, 2016), which is a continuation of U.S. patent application Ser. No. 13/601,452 filed on Aug. 31, 2012 (now U.S. Pat. No. 8,442,520 which issued on May 14, 2013) and a continuation of U.S. patent application Ser. No. 13/601,413 filed on Aug. 31, 2012 (now U.S. Pat. No. 8,792,880 which issued on Jul. 29, 2014), each of which is a continuation of U.S. patent application Ser. No. 13/552,896 filed Jul. 19, 2012 (now U.S. Pat. No. 8,311,533 which issued on Nov. 13, 2012), which is a continuation of U.S. patent application Ser. No. 12/355,341 filed Jan. 16, 2009 (now U.S. Pat. No. 8,254,913 which issued on Aug. 28, 2012), which is a continuation-in-part of U.S. patent application Ser. No. 11/622,811 filed on Jan. 12, 2007, which is a continuation-in-part of U.S. patent application Ser. No. 11/206,695 filed on Aug. 18, 2005, the contents of each of which are incorporated herein in their entireties.

FIELD OF THE INVENTION

The invention relates generally to wireless telecommunications. More specifically, the present invention relates to a broadband data communications system for in-flight aircraft.

BACKGROUND ART

High speed data communications are becoming more and more desirable and important to society. Most high speed data connections are available through telephone lines, cable modems or other such devices that have a physical wired connection. Since such a wired connection has limited mobility, wireless techniques for data communications are very attractive for airline passengers. However, cellular high speed wireless data links have a range which in not practical for in-flight use due to throughput limitations. Alternatively, high speed links are available from satellites for in-flight aircraft. This option is costly since it requires a satellite link as well as specialized antennae and other equipment for the aircraft and also consists of throughput limitations which impact usefulness. Consequently, there is a need for a system that provides high speed data communications link to an in-flight aircraft at a reasonable cost.

SUMMARY OF THE INVENTION

In some aspects, the invention relates to a network for providing high speed data communications, comprising: a plurality of terrestrial transmission stations that are located within overlapping communications range; and a mobile receiver station, where the plurality of terrestrial transmission stations provide a continuous and uninterrupted high speed data communications link with the mobile receiver station according to the IEEE 802.16 Air Interface Standard terrestrial radio access network protocol in a mesh network configuration.

In other aspects, the invention relates to a network for providing high speed data communications, comprising: a plurality of terrestrial transmission stations that are located within overlapping communications range; and an airborne receiver station, where the plurality of terrestrial transmission stations provide a continuous and uninterrupted high speed data communications link with the mobile receiver station according to the IEEE 802.16 Air Interface Standard.

In other aspects, the invention relates to a network for providing high speed data communications, comprising: a plurality of terrestrial transmission stations that are located within overlapping communications range; and a seaborne receiver station, where the plurality of terrestrial transmission stations provide a continuous and uninterrupted high speed data communications link with the mobile receiver station according to the IEEE 802.16 Air Interface Standard.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
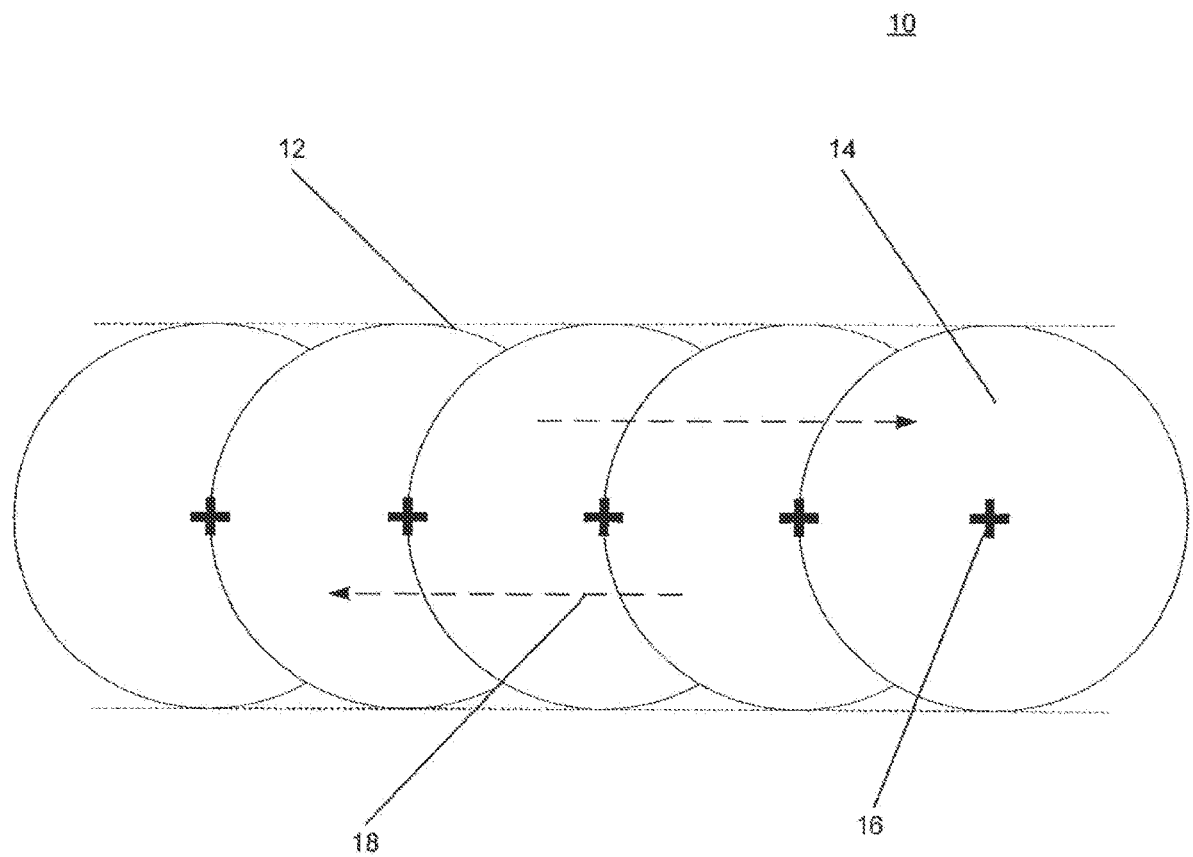
FIG. 1 shows a schematic view of a broadband communication system for in-flight aircraft in accordance with one embodiment of the present invention.

The present invention is a system of providing high speed data communications for in-flight airliners utilizing a series of ground based transmitters along established common flight paths for multiple aircraft called "air corridors" that provides an IEEE 802.16 Air Interface Standard or OFDM "WiMax" connection. The ground transmitters are located in a pattern to provide overlapping coverage as an aircraft passes from one transmitter to the other. This allows passengers on the aircraft to have uninterrupted high speed data communications while in the air. The high speed data communications link between the passenger and the ground allows for a direct link that is continuous and uninterrupted in time. The direct link may be between the passenger and the ground station. Alternatively, the direct link may be between the aircraft and the ground station where the passenger accesses an on board network. The network would typically be run by an on-board server that would be in communication with the ground station and the passenger and also be continuous and uninterrupted in time.

The IEEE 802.16 Air Interface Standard, often called "WiMax" and built upon OFDM protocols as part of the next generation wireless (4G), is a specification for fixed broadband wireless access systems employing a point-to-multipoint (PMP) architecture. The IEEE 802.16 Air Interface Specification is a very capable, while complex, specification with current data transfer rates as high as 75 megabits per second (Mbps), and sometimes higher. There are allowances for a number of physical layers for different frequency bands and region-by-region frequency regulatory rules. There are features that allow an IP centric system or an ATM centric system depending upon the needs of customers. The specification is designed to cover application to diverse markets from very high bandwidth businesses to SOHO and residential users. The initial version was developed with the goal of meeting the requirements of a vast array of deployment scenarios for broadband wireless access (BW A) systems operating between 10-66 GHz. Revisions to the base IEEE 802.16 standard targeting the sub 11 GHz are envisioned and intended to be captured for use within the scope of the present invention. The present invention envisions inclusion of the technology and performance requirements of IEEE 802.16, i.e. OFDM, but may include other technology adaptations to achieve connectivity with an aircraft in flight. OFDM is considered to be a distinguishing feature of the next generation wireless radio technology, also known as "4G."

System Profiles, Protocol Implementation Conformance Statement Proforma, Test Suite Structure & Test Purposes, and Abstract Test Suite specifications for 10 to 66 GHz and sub 11 GHz, have been developed all according to the ISO/IEC 9464 series (equivalent to ITU-T x.290 series) of conformance testing standards. The 802.16 standard covers both the Media Access Control (MAC) and the physical (PHY) layers access standard for systems in the frequency ranges 10-66 GHz and sub 11 GHz.

A number of PHY considerations were taken into account for the target environment. At higher frequencies, line-of-sight is a must. This requirement eases the effect of multipath, allowing for wide channels, typically greater than 10 MHz in bandwidth. This gives IEEE 802.16 the ability to provide very high capacity links on both the uplink and the downlink. For sub 11 GHz non line-of-sight capability is a requirement. The standard is designed to accommodate either Time Division Duplexing (TDD) or Frequency Division Duplexing (FDD) deployments, allowing for both full and half-duplex terminals in the FDD case. The current invention envisions utilizing multiple custom adaptations of the PHY layer of software.

The MAC is designed specifically for the PMP wireless access environment. It supports higher layer or transport protocols such as ATM, Ethernet or Internet Protocol (IP), and is designed to easily accommodate future protocols that have not yet been developed. The MAC is designed for very high bit rates of the truly broadband physical layer, while delivering ATM compatible Quality of Service (QoS); UGS, rtPS, nrtPS, and Best Effort. The present invention envisions multiple unique configurations of the MAC layer of the radio system.

The frame structure allows terminals to be dynamically assigned uplink and downlink burst profiles according to their link conditions. This allows a tradeoff between capacity and robustness in real-time, and provides roughly a two times increase in capacity on average when compared to non-adaptive systems, while maintaining appropriate link availability.

The 802.16 MAC uses a variable length Protocol Data Unit (PDU) along with a number of other concepts that greatly increase the efficiency of the standard. Multiple MAC PDUs may be linked into a single burst to save PHY overhead. Additionally, multiple Service Data Units (SDU) for the same service may be linked into a single MAC PDU, saving on MAC header overhead. Fragmentation allows very large SDUs to be sent across frame boundaries to guarantee the QoS of competing services. And, payload header suppression can be used to reduce the overhead caused by the redundant portions of SDU headers.

The MAC uses a self-correcting bandwidth request/grant scheme that eliminates the overhead and delay of acknowledgements, while simultaneously allowing better QoS handling than traditional acknowledged schemes. Terminals have a variety of options available to them for requesting bandwidth depending upon the QoS and traffic parameters of their services. They can be polled individually or in groups. They can recycle bandwidth already allocated to make requests for more. They can signal the need to be polled, and they can piggyback requests for bandwidth. This is made possible with "beam forming" of the signal down to a 4 degree wide "pencil beam". Beam forming also enables the signal to be electronically adapted (null steering) to connect with a fast-moving aircraft.

FIG. 1 shows an example of a broadband communication system 10 for in-flight aircraft in accordance with one embodiment of the present invention. The system 10 includes a series of ground located transmitters 16 located along an air corridor 12. As an airliner passes along its flight path 18, it moves along different coverage areas 14 provided by the transmitters 16 without a loss of communications. It should be understood that a single transmitter 16 may cover all aircraft within range in the air corridor 12. Through the unique properties of 4G OFDM technology envisioned in the present invention, one base station is able to reuse the same frequency to communication with multiple aircraft simultaneously. Also, an aircraft may be simultaneously within the overlapping range of multiple transmitters 16 as it travels along its flight path 18. When an aircraft is in the coverage area, as well as when the aircraft is moving from one coverage area to the next, the passenger is able to remain in contact with the ground station through a direct link, continuous and without interruption in time.

Figure 2:
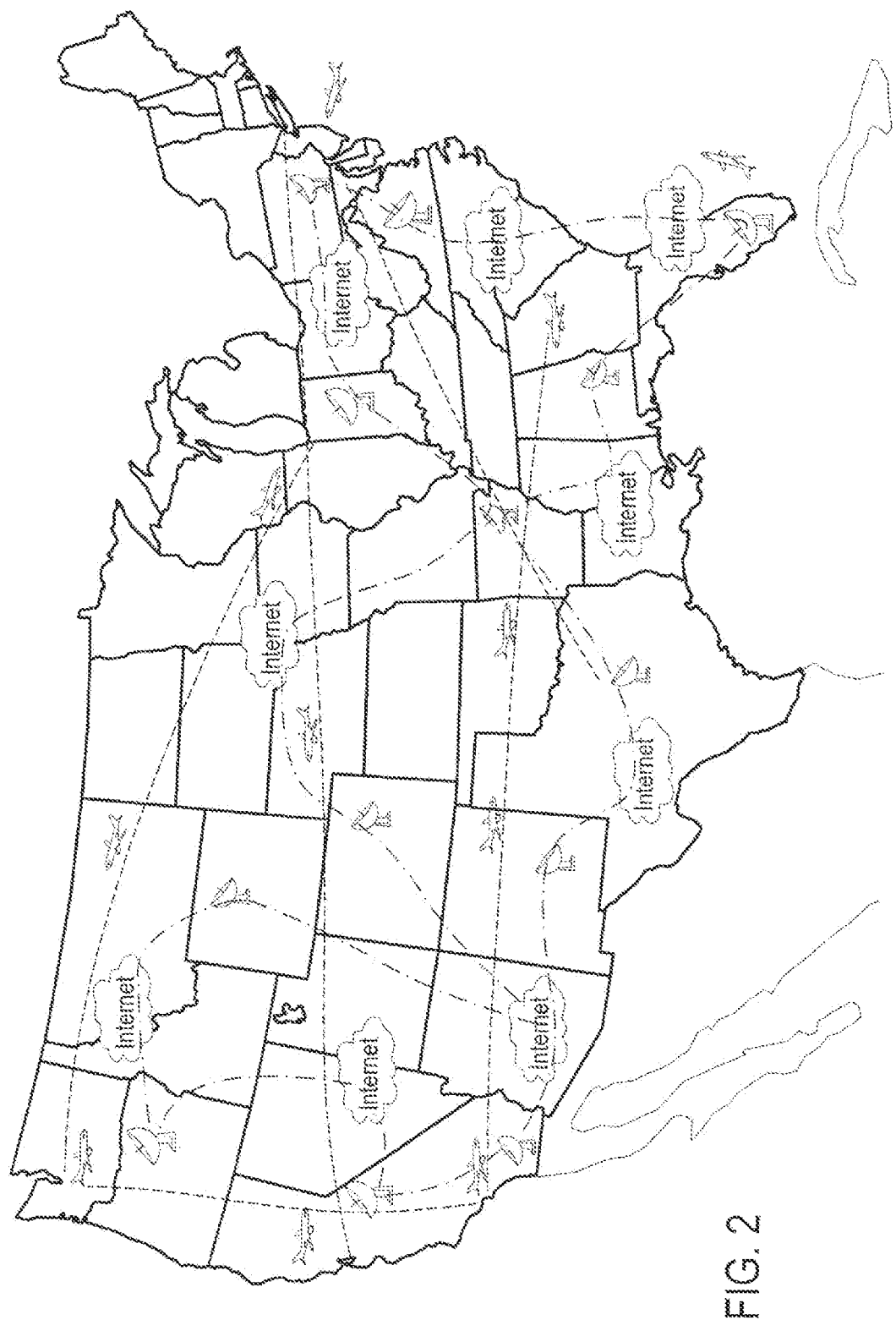
FIG. 2 shows an example of a broadband communication system for the continental United States in accordance with one embodiment of the present invention.

FIG. 2 shows an example of a WiMax broadband communication system 20 for the continental United States. It should be noted that the drawing is not to scale and the actual number of transmitters will be greater than shown. Transmission of WiMax signals typically requires a line-of-sight (LOS) link between the transmitter and receiver. While conventional WiMax performance standards typically have a maximum range of 34 miles, it is important to note that this range is from ground point to ground point. WiMax has a range of well over 100 miles for a ground point to aircraft link due to the increased distance of a LOS link and other modifications to an OFDM-based radio.

A great majority of passenger aircraft in the United States travel in "air corridors" that function similar to highways. Air corridors typically exist along major east/west and north/south routes between high population areas (e.g., California, the northeastern corridor of the United States, etc.). Aircraft are routed along these corridors in order to more efficiently move air traffic to and from their final destinations. Since most air traffic passes through these paths, a system for providing 4G WiMax access to in-flight aircraft could cover only the air corridors in lieu of trying to provide coverage for all airspace in the country. This has the advantage of providing a significant cost advantage by reducing the number of transmitters while still covering the majority of flights. However, as the OFDM signal flows outward from the typical air corridors, the signal becomes weaker but nonetheless perceptible by random-flying aircraft.

The system provides high speed broadband communications to an in-flight aircraft while the aircraft is within the air corridor. Technology to manage the user's transition from one transmitter to another is well known to those of ordinary skill in the art. The communications link may provide the user with such data communications as internet access, streaming video, voice-over IP, etc. Additionally, the system may provide data on the aircraft to parties on the ground such as an air traffic controller. Examples of aircraft data include air traffic control information, aircraft status and performance information, video security surveillance of the aircraft interior, etc. The system may be accessed directly by an individual aboard an aircraft via a direct communication link that is continuous and uninterrupted in time with the ground. In an alternative embodiment, the system may be accessed by the aircraft that it in turn provides individual with direct access that is continuous and uninterrupted in time via an onboard network such as a LAN or in-cabin wireless network via a server relayed to the ground using the modified OFDM or WiMAX connection.

Figure 3:
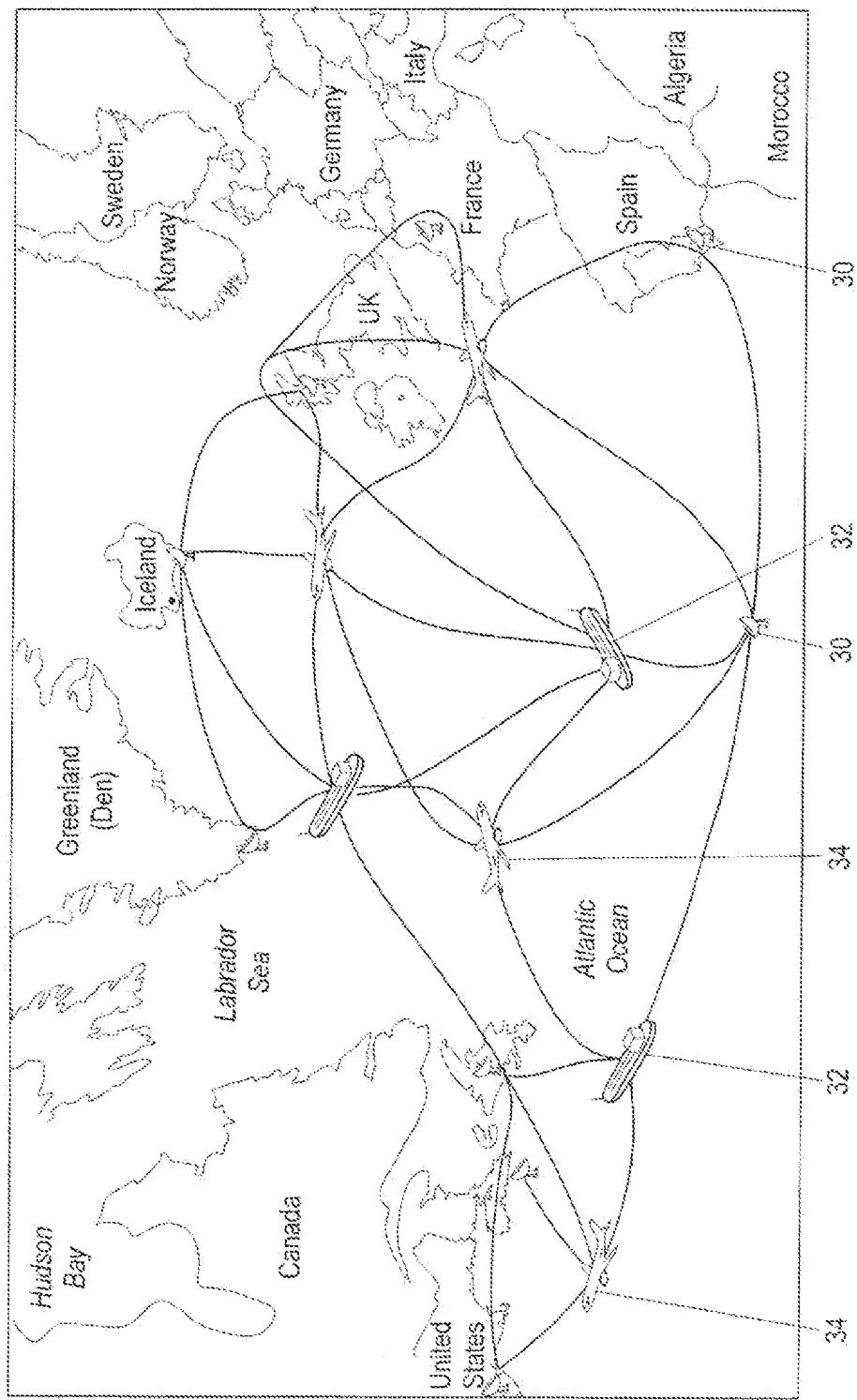
FIG. 3 shows a schematic view of a broadband communication network over the ocean for in-flight aircraft and shipping in accordance with one embodiment of the present invention.

FIG. 3 shows an alternate embodiment of the present invention. Specifically, it shows a schematic view of a broadband communication network over the ocean for in-flight aircraft and surface shipping. In this embodiment, the network utilizes "terrestrial" based stations that include land based stations 30, ocean shipping 32 and in-flight aircraft 34. Under this definition, any surface node (land or sea) or in-flight node is considered terrestrial. These nodes interlink to form a network "mesh" that may include: an air mesh; a sea mesh; or a combined air-sea mesh. Under this definition, the nodes share interconnectivity where the individual nodes of the mesh network serve as repeaters in and among each other to provide redundancy of communication links. Additionally, it should be understood in this application that the use of the terms "aircraft" and "airliner" are interchangeable and should include all types of aviation including: commercial aviation, military aviation, and general aviation of all types and purposes.

Figure 4A:
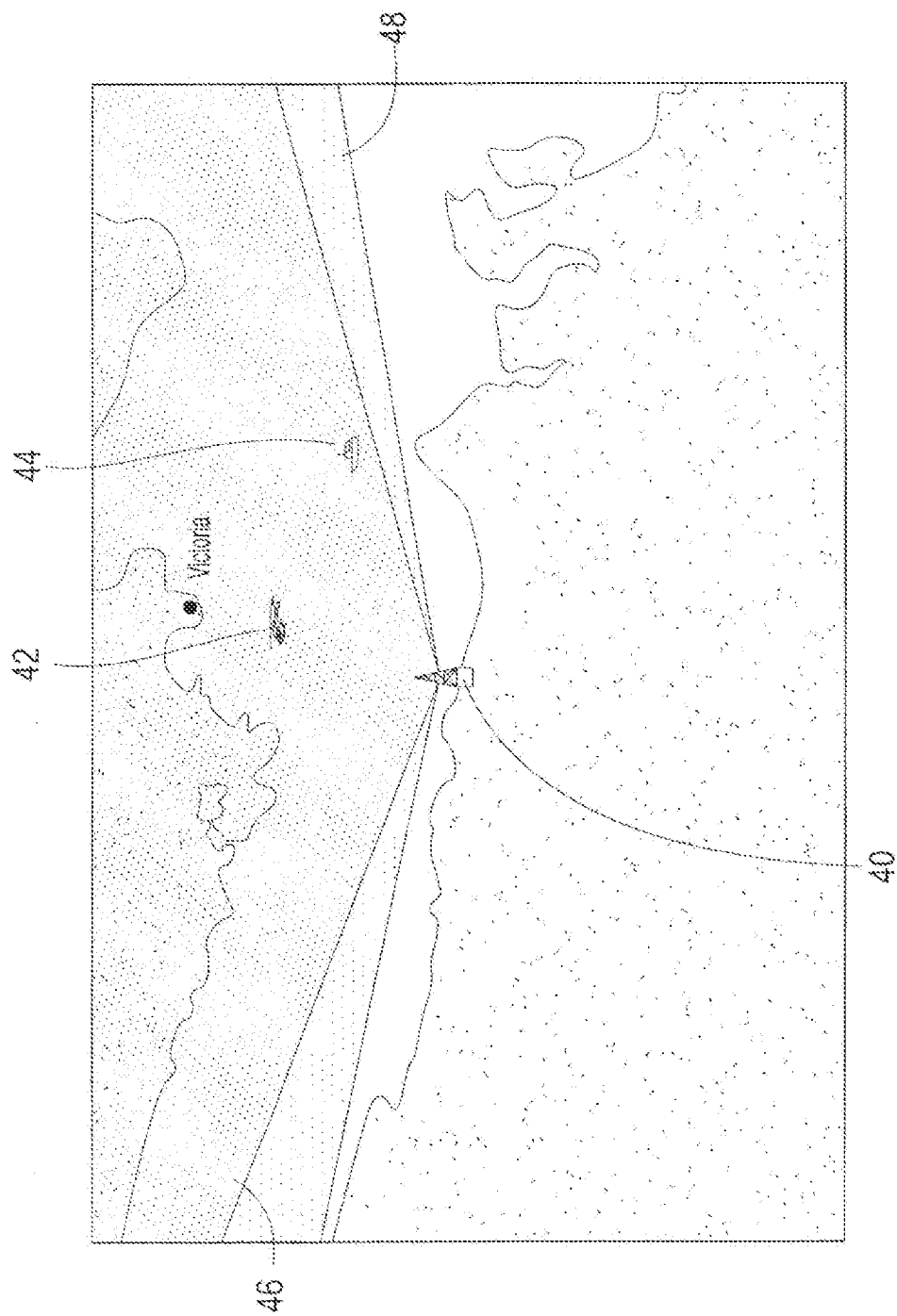
FIGS. 4*a* and 4*b* show views of the results of computer simulations of the performance of the network in accordance with one embodiment of the present invention.
Figure 4B:
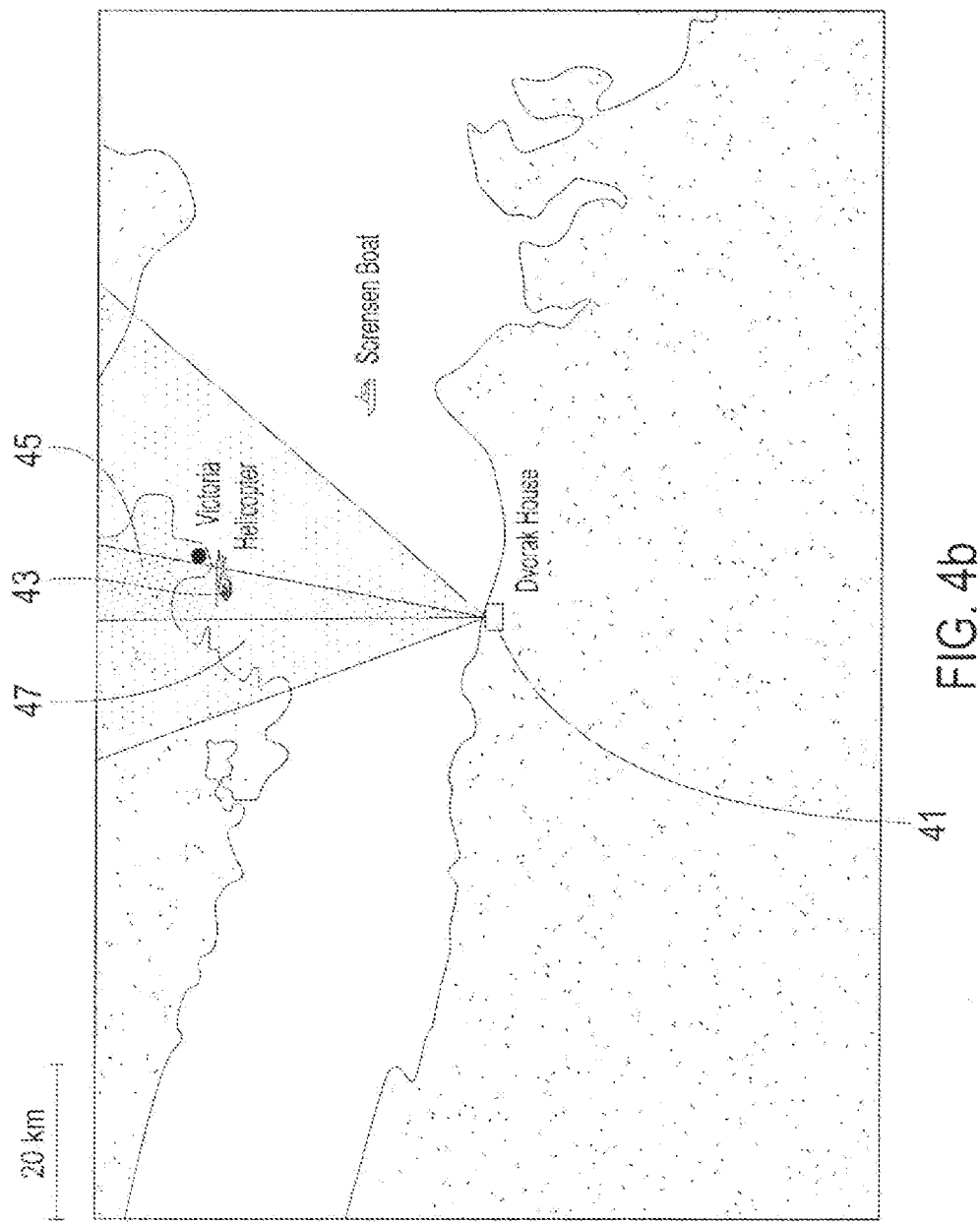

In order to understand and typify the expected radio coverage of the present invention, as well as prepare for the FCC STA authorization process, a comprehensive Frequency Plot Map was created. FIG. 4*a* shows a schematic view of the results of one Frequency Plot Map created by a computer simulation of the performance of the network in accordance with one embodiment of the present invention. The diagram shows a simulated network in a section of Puget Sound between the coast of Washington and British Columbia. A land based station 40 is making a communications link to a helicopter 42 and a boat 44. The smaller operating area 46 shows the range of communications links at an operating frequency of 5.8 MHz. The larger operating area 48 shows the range of communications links at an operating frequency of 3.5 MHz FIG. 4*b* shows a second frequency plot map created by the same computer simulation. The map shows a base station 41 on land and a target helicopter 43. The simulated system utilizes the Proxim Networks Tsunami MP.16 Model 3500 and Model 3338-AOO-060 antenna operating at a frequency of 3.5 GHz. The broader area 47 represents horizontal coverage for antenna mounted at 407 foot elevation confined to 60 degree Azimuth Beamwidth. The more narrow area 45 represents vertical coverage area of 10 degree Elevation Beamwidth at target height of 10,800 feet.

Both frequency plot maps were generated with Radio Mobile Version 7.1.1 software utilizing the plot transmission characteristics of the raw RF signal. Radio Mobile is a Radio Propagation and Virtual Mapping computer simulation software that is listed as Freeware. The software uses digital terrain elevation data for automatic extraction of a path profile between a transmitter and a receiver. The path data is added to radio system specific attributes, environmental and statistical parameters to feed into an Irregular Terrain Model radio propagation calculation. The software utilizes USGS Earth Resource Observation and Science (EROS) data provided by the United States Geological Survey. The data sets are in BIL format at ⅓ arc second resolution (3 meter).

The use of Radio Mobile software, customized for the 3.5 GHz frequency band as well as for the particular lobe characteristics of the flat panel antenna, demonstrated a 20+ mile Line of Site (LOS) transmission distance. The resultant plots were then incorporated in the STA application process and submitted to the FCC for approval of a Temporary authority to utilize licensed frequencies in and around the subject test area.

In the present invention, reuse of frequencies made possible with "beam forming" of the signal down to a 4 degree wide "pencilbeam" by a "software definable radio (SDR)". In these embodiments, the signal is transmitted down such a narrow beam that interference with nearby signals on the same or very close frequencies is minimized. By using a buffer range between beams of the signals, the same frequencies may be recycled or re-used for different communications links between nodes. In optimum conditions, it is possible to achieve 288 reuses of the same frequency. This has the great advantage of minimized the necessary frequency spectrum required to operate the network.

Another advantage of the use of SDR involves a more stable and manageable system of transitioning between communications links among moving nodes. With a narrow beam, a high quality communication link may be established with a more distant node rather than the closest node. This link will conceivably last longer as the distant node moves through the transmission range towards the base station.

Figure 5:
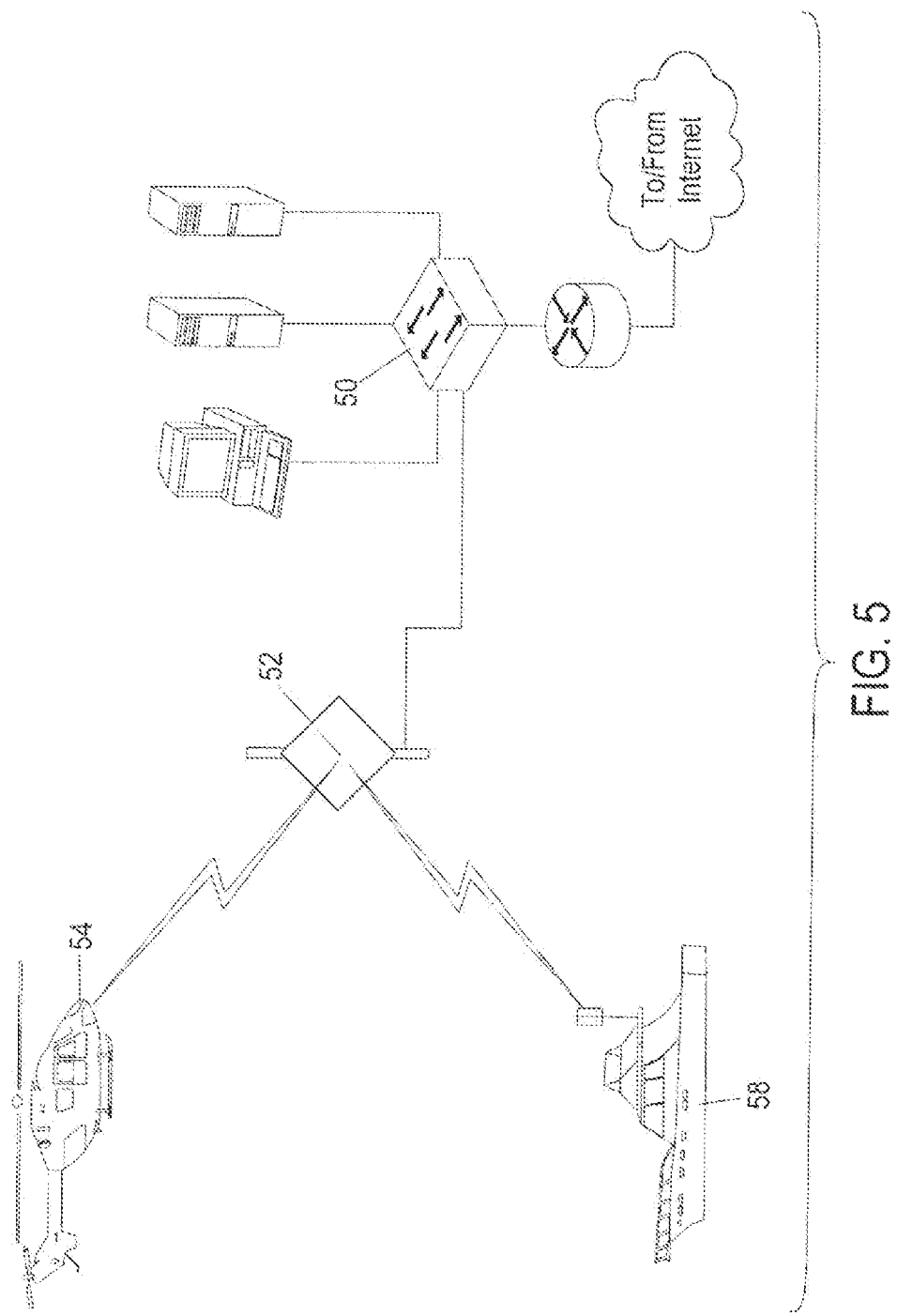
FIG. 5 shows a diagram of the actual test network that was simulated in FIGS. 4*a* and 4*b* in accordance with one embodiment of the present invention.

FIG. 5 shows a schematic diagram of the actual test network that was simulated in FIG. 4 in accordance with one embodiment of the present invention. An internet access link 50 is provided through a land based computer network. The link is connected to a base station antenna 52 that focuses the RF energy to the intended receiver. In this embodiment, the antenna is a Proxim Wireless Flat Panel Model 3338-AOO-060 external antenna. The antenna is part of Proxim's Wireless's Tsunami MP.16 Model 3500 products. These products include a Model M3500-BSR-EU base station and a Model 3500-SSR-EU subscriber unit. The antenna 52 is vertically polarized with a 17 dBi gain. It has an azimuth beamwidth of 60°+/−4° and an elevation beamwidth of 10°.

The test network comprised several discreet elements. At the core of the network, the Tsunami MP.16 Model 3500 base station was mounted on top of a roof structure at a height of 407 feet above sea level, as measured by GPS receivers. The base station was connected via 100BaseT to an Ethernet switch that hosted several data servers; a file server for large file transfer, a network management/Data capture station, and a video server utilizing VLC's server side software to multicast a movie file through the WiMAX link. The network core was also attached to the internet via a DSL router that had a 1.5 Mb downlink and 768 uplink connection.

Figure 6:
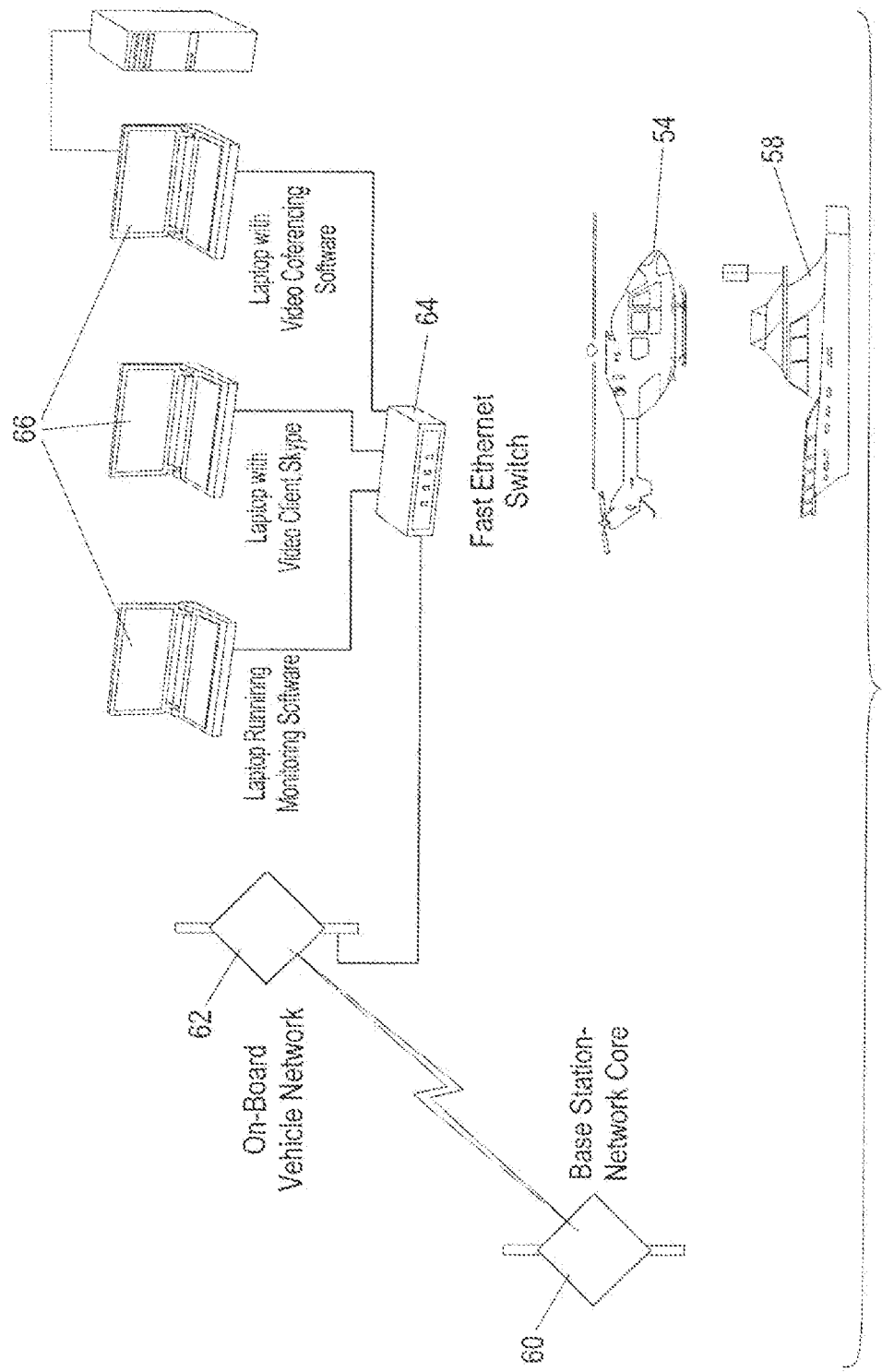
FIG. 6 shows a diagram of the internal network configurations for the target craft shown in FIG. 5 in accordance with one embodiment of the present invention.

FIG. 6 shows a diagram of the internal network configurations for the target craft shown in FIG. 5 in accordance with one embodiment of the present invention. In each target vehicle 54 and 58, a Tsunami MP.16 Model 3500 subscriber unit was installed as well as a 17 dBi external Patch antenna 62. An onboard switched network 64 was created to connect 3 laptops 66, each running specific applications for the test suite including: a video client/skype VOIP unit; a data collection/network monitoring unit; and a video conferencing unit utilizing a Logitech 1.3 Megapixel QuickCam supporting both Yahoo and Microsoft messaging clients. Variations were undertaken in some vehicles due to variations in onboard-power options and restrictions to mounting options and location of equipment.

Wind-load survival for the Proxim Model 333 S-AOO-060 antenna is calculated at 220 Km/h, and is operationally rated at 160 Km/h, as such it was not possible to mount the antenna to the exterior of the aircraft as the aircraft's top speed is 230 Km/h. Instead the antenna was mounted inside the canopy in the copilot's seat position which did have some effect on antenna aiming/signal reception due to large nearby metal objects such as the avionics instrument cluster, etc. This issue was partially mitigated by manual manipulation of the helicopter orientation in flight by the pilot after signal degradation was noted, or manual movement of the antenna if flight path reorientation was not practical.

The demonstration testing of WiMAX capable equipment in the 3.5 GHz and 5.8 GHz spectrum ranges successfully established communications with both airborne and water based vehicles. The initial test is targeted at the range of 20 miles, with later portions of the test at 50 miles. Both vehicles were initially stationary in position (PtP), but the airborne target also tested altitude targets up to two vertical miles. In the final stages of testing, the airborne vehicle traveled at higher speeds (PtMP). The tests were conducted utilizing the IEEE 802.15-2004 Standard for mobile applications. The tests comprised multiple phases with increasing difficultly. These phases were: (1.) 20 mile LOS, PTP shot to boat; (2.) 20 mile LOS, PTP shot to helicopter, 200' above boat; (3.) 21 mile LOS, PTP shot to helicopter, 10,572' (2 mi) above boat; (4.) 20-mile radius speed tests to helicopter at 10,000'; and (5.) LOS, PTP distance test at 10,000'.

The Proxim equipment, though locked to QPSK-3/4 Modulation/FEC and below modulation types, was able to reliably operate at 30.52 statutory miles from the base station, and was able to reliably operate at 140 MPH. Combined transmit/receive data rates above 2 Mbps were realized in many portions of the test areas. Video conferencing via MSN messenger, VOIP calls via Skype, remote streaming of movie files, and large file transfers were simultaneously executed at distances of 20+ miles, and during vehicle movement—even at high speeds. Multi-megabit data transmission speeds were achieved during multiple samples, as well as testing of VOIP applications, high-speed file transfers, video conferencing to various locations in the United States, and multi-media video streaming of large movie files.

Doppler shift and signal reflectivity from water were observed during testing. To rectify these factors, the subscriber antenna elevation was modified upward to reduce or eliminate water reflectivity causing signal interference. Doppler shift, though observed only at speed in excess of approximately 100 mph, did not cause signal failure but marginally impacted the rate of throughput. This variance is to be expected with the version of gear employed in the test, which was designed and configured for point to point (PTP) transmission. The impact of Doppler shift is anticipated to be further minimized in newer versions of WiMAX gear, with the 802.16-2005 standard, which is designed with forward error correction capability.

It is intended that embodiments of the present invention include present and future versions of IEEE 802.16 Air Interface Standard that are consistent with the present disclosure. For example, the IEEE Standard 802.16-2004 (approved in June 2004) renders the previous (and 1st) version 802.16-2001 obsolete, along with its amendments 802.16a and 802.16c. However, IEEE Standard 802.16-2004 addresses only fixed systems such as Local area networks (LANs) and metropolitan area networks (MANs).

IEEE Standard 802.16-2005 (approved December, 2005 and formerly named 802.16e) adds mobility components to the WiMax standard. This WiMAX mobility standard is an improvement on the modulation schemes stipulated in the original WiMAX standard. It allows for fixed wireless and mobile Non Line of Sight (NLOS) applications primarily by enhancing the Orthogonal Frequency Division Multiplexing Access (OFDMA). It is possible that by stipulating a new modulation method called Scalable OFDMA (SOFDMA), the 802.16-2005 standard will make the older 802.16-2004 standard which uses OFDM-256 outdated. However, there are plans for a migration path from the older version of the standard to the more robust, mobile modulation scheme. In any case, compatibility between similar system profiles is a distinct possibility. SOFDMA and OFDMA256 are typically not compatible so most equipment may have to be replaced. However, attempts are being made to provide a migration path for older equipment to OFDMA256 compatibility which would ease the transition for those networks which have already made the switch to SOFDMA.

SOFDMA will improve upon OFDM256 for NLOS applications by improving NLOS coverage by utilizing advanced antenna diversity schemes, and hybrid-Automatic Retransmission Request (hARQ). Also, system gain is increased by use of denser sub-channelization, thereby improving indoor penetration. The newer standard introduces high-performance coding techniques such as Turbo Coding and Low-Density Parity Check (LDPC), enhancing security and NLOS performance and introduces downlink sub-channelization, allowing network administrators to trade coverage for capacity or vice versa. It also improves coverage by introducing Adaptive Antenna Systems (AAS) and Multiple Input-Multiple Output (MIMO) technology. It eliminates channel bandwidth dependencies on sub-carrier spacing, allowing for equal performance under any RF channel spacing (1.25-14 MHz). Finally, SOFDMA's enhanced Fast Fourier Transform (FFT) algorithm can tolerate larger delay spreads and there by increasing resistance to multi path interference.

WiMAX's equivalent in Europe is HIPERMAN. Efforts are underway to make 802.16 and HIPERMAN interoperate seamlessly. Additionally, Korea's telecom industry has developed its own standard, WiBro which is expected to be fully interoperable with WiMAX. Consequently, it is fully intended that the definition of "WiMax" and IEEE Standard 802.16 cover any and all versions, modifications and equivalents of this wireless communication standard, inclusive of OFDM technology, also known as next generation wireless or 4G.

In other embodiments of the present invention, alternative communications protocols could be used. For example, one embodiment of the invention could use the UTRAN Long Term Evolution (LTE) Terrestrial Radio Access Network protocol which is based on or utilizes OFDM technology. Versions of LTE may utilize radio air interface technology known as Orthogonal Frequency Division Multiple Access (OFDMA) to provide several key benefits including significantly increased peak data rates, increased cell edge performance, reduced latency, scalable bandwidth, co-existence with GSM/EDGE/UMTS systems, reduced CAPEX and OPEX. LTE is scalable to allow operation in a wide range of spectrum bandwidths, from 1.4-20 MHz, using both Frequency Division Duplex (FDD) and Time Division Duplex (TDD) modes of operation, thus providing flexibility to suit any user's existing or future frequency allocation.

The performance characteristics for LTE versions of next generation of 4G technology include: peak download rates of 326.4 Mbit/s for 4×4 antennas and 172.8 Mbit/s for 2×2 antennas for every 20 MHz of spectrum; peak upload rates of 86.4 Mbit/s for every 20 MHz of spectrum; at least 200 active users in every 5 MHz cell. (i.e., 200 active data clients); sub-5 ms latency for small IP packets; spectrum flexibility for spectrum slices as small as 1.4 MHz (and as large as 20 MHz); optimal ground to ground cell size of 5 km, 30 km sizes with reasonable performance, and up to 100 km cell sizes supported with acceptable performance (this will be increased for air to ground cells); co-existence with legacy standards (users can transparently start a transfer of data in an area using an LTE standard, and, should coverage be unavailable, continue the operation without any action on their part using GSM/GPRS or W-CDMA-based UMTS or even 3GPP2 networks such as CDMA or EV-DO; and support for a MBSFN (Multicast Broadcast Single Frequency Network) which can deliver services such as Mobile TV using the LTE infrastructure.

Another alternative communications protocol that could be used is the IEEE Standard 802.20 which is known as "The Standard Air Interface for Mobile Broadband Wireless Access Systems Supporting Vehicular Mobility—Physical and Media Access Control Layer Specification" (hereafter "802.20"). 802.20 is a variation of next generation wireless or 4G technology, a mobility enhancement of 802.16. 802.20 is defined as a protocol for boosting IP-based data-transmission rates for mobile users in wireless metropolitan area networks (WMANs). It would be capable of supporting people and devices sitting in trains, subways and automobiles traveling at up to 150 miles per hour. 802.20 would support transmission speeds of up to 1M bit/sec in the 3-GHz spectrum band. 802.20 is also based on OFDM. The 802.20 standard seeks to boost real-time data transmission rates in wireless metropolitan area networks connections based on cell ranges of up to 15 kilometers or more for ground to ground stations. This range will be greater for ground to air connections.

802.20 shares some similarities with IEEE Standard 802.16e. The 802.16e and 802.20 standards both specify mobile air interfaces for wireless broadband. On the surface the two standards are similar, but there are some important differences between them. Specifically, 802.16e will add mobility in the 2 to 6 GHz licensed bands while 802.20 aims for operation in licensed bands below 3.5 GHz. Typically, 802.16e will be used by the mobile user walking around with a PDA or laptop, while 802.20 will address high-speed mobility issues. Another key difference will be the manner in which the two are deployed with users deploying 802.20 as an overlay to their existing networks including existing 802.16 networks.

While the invention has been described based on fundamental embodiments of the forms of next generation wireless or 4G technology, it also should be understood that all described embodiments may utilize hybrid or modified versions of the next generation wireless technology, 4G or 802.16 (WiMAX) based on or utilizing OFDM as applicable. It is recognized that these embodiments describe only portions of the foundation components necessary in the construction of a radio to communicate with an aircraft at true broadband data rates over extreme distances. Such a transceiver, modified to the magnitude necessary to maintain an effective communication continuous and uninterrupted in time with aircraft at jet speed and extreme distances from the terrestrial station, will include protocols and code which are not presently included within the definitions or standards of 802.16 or WiMAX or LTE. Despite the modification of the 4G transceivers, both terrestrial and airborne units, inclusion of the component elements described in 802.16 or WiMAX or LTE, specifically to include OFDM, make such a radio subject to the claims of this invention.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A ground station among a network of ground stations configured to provide high speed wirelessly transmitted data communications to an in-flight aircraft, the ground station comprising:
    an antenna assembly operably coupled to software defined radio to control the antenna assembly; and
    a radio operably coupled to the antenna assembly to process signals sent or received at the antenna assembly utilizing Orthogonal Frequency Division Multiplexing (OFDM),
    wherein the radio is configured to communicate with a receiver station located on board the in-flight aircraft to provide a high speed data communications link with the receiver station,
    wherein the high speed data communications link is maintained while the in-flight aircraft transitions between a coverage area provided by the ground station and coverage areas of respective ones of the other ground stations as the in-flight aircraft moves from the coverage area provided by the ground station to one of the respective ones of the coverage areas provided by the respective ones of the other ground stations,
    wherein the radio employs about a 1.4 MHz bandwidth using a Frequency Division Duplex (FDD) mode of operation, and
    wherein the high speed data communications link has a range of greater than 50 miles.

2. The ground station of claim 1, wherein the high speed data communications link employs Long Term Evolution (LTE) terrestrial radio access network protocols.

3. The ground station of claim 1, wherein latency between the ground station and the in-flight aircraft is less than 5 msec.

4. The ground station of claim 1, wherein the radio employs forward error correction to enable the high speed data communications link to be maintained with the in-flight aircraft at speeds of at least 140 miles per hour.

5. The ground station of claim 1, wherein the high speed data communications link provides internet access, streaming video, and voice-over IP to the receiver station.

6. The ground station of claim 1, wherein the ground station is configured to communicate with multiple aircraft simultaneously.

7. The ground station of claim 1, wherein the radio employs a Scalable Orthogonal Frequency Division Multiple Access (SOFDMA) modulation scheme.

8. The ground station of claim 7, wherein the radio employs Adaptive Antenna Systems (AAS) and Multiple Input-Multiple Output (MIMO) technology.

9. The ground station of claim 7, wherein the radio employs an enhanced Fast Fourier Transform (FFT) algorithm to provide resistance to multi-path interference.

10. A ground station among a network of ground stations configured to provide high speed wirelessly transmitted data communications to an in-flight aircraft, the ground station comprising:
an antenna assembly operably coupled to software defined radio to control the antenna assembly; and
a radio operably coupled to the antenna assembly to process signals sent or received at the antenna assembly utilizing Orthogonal Frequency Division Multiplexing (OFDM),
wherein the radio is configured to communicate with a receiver station located on board the in-flight aircraft to provide a high speed data communications link with the receiver station employing,
wherein the high speed data communications link is maintained while the in-flight aircraft transitions between a coverage area provided by the ground station and coverage areas of respective ones of the other ground stations as the in-flight aircraft moves from the coverage area provided by the ground station to one of the respective ones of the coverage areas provided by the respective ones of the other ground stations,
wherein the radio employs about a 1.4 MHz bandwidth using a Time Division Duplex (TDD) mode of operation,
wherein the high speed data communications link has a range of greater than 50 miles, and
wherein the radio employs forward error correction to enable the high speed data communications link to be maintained with the in-flight aircraft at speeds of at least 140 miles per hour.

11. The ground station of claim 10, wherein the high speed data communications link employs Long Term Evolution (LTE) terrestrial radio access network protocols.

12. The ground station of claim 10, wherein a frame structure utilized for the high speed data communications link provides dynamically assignable uplink and downlink burst profiles based on link conditions.

13. The ground station of claim 10, wherein latency between the ground station and the in-flight aircraft is less than 5 msec.

14. The ground station of claim 10, wherein the high speed data communications link provides internet access, streaming video, and voice-over IP to the receiver station.

15. The ground station of claim 10, wherein the ground station is configured to communicate with multiple aircraft simultaneously.

16. The ground station of claim 10, wherein the radio employs a Scalable Orthogonal Frequency Division Multiple Access (SOFDMA) modulation scheme, and wherein the radio employs an enhanced Fast Fourier Transform (FFT) algorithm to provide resistance to multi-path interference.

17. A network configured to provide high speed wirelessly transmitted data communications to an in-flight aircraft, the network comprising:
a plurality of ground transmission stations, the ground transmission stations being located such that at least some of the ground transmission stations are within overlapping communications range of respective other ones of the ground transmission stations, the ground transmission stations being configured to communicate with a receiver station located on board the in-flight aircraft to provide a high speed data communications link to the in-flight aircraft; and
a software defined radio at each of the ground transmission stations, the software defined radio being operably coupled to an antenna assembly of each respective one of the ground transmission stations to control the antenna assembly, the software defined radio being configured to enable processing of signals sent or received at the antenna assembly utilizing Orthogonal Frequency Division Multiplexing (OFDM),
wherein the high speed data communications link is maintained while the in-flight aircraft is within a coverage area provided by one of the plurality of ground transmission stations and as the in-flight aircraft transitions from the coverage area provided by the one of the plurality of ground transmission stations to a coverage area provided by another of the plurality of ground transmission stations,
wherein the software defined radio employs about a 1.4 MHz bandwidth using a Time Division Duplex (TDD) or Frequency Division Duplex (FDD) mode of operation, wherein the high speed data communications link has a range of greater than 50 miles, and
wherein the software defined radio employs forward error correction to enable the high speed data communications link to be maintained with the in-flight aircraft at speeds of at least 140 miles per hour.

18. The network of claim 17, wherein the high speed data communications link employs Long Term Evolution (LTE) terrestrial radio access network protocols.

19. The network of claim 17, wherein the software defined radio employs a Scalable Orthogonal Frequency Division Multiple Access (SOFDMA) modulation scheme, and wherein the software defined radio employs an enhanced Fast Fourier Transform (FFT) algorithm to provide resistance to multi-path interference.

20. The network of claim 17, wherein latency between the software defined radio and the in-flight aircraft is less than 5 msec.

* * * * *